United States Patent [19]
Griffen et al.

[11] Patent Number: 5,680,042
[45] Date of Patent: Oct. 21, 1997

[54] MAGNETORESISTIVE SENSOR WITH REDUCED OUTPUT SIGNAL JITTER

[75] Inventors: Neil C. Griffen; Richard S. Stokes, both of Westerville, Ohio

[73] Assignee: Lake Shore Cryotronics, Inc., Westerville, Ohio

[21] Appl. No.: 366,580

[22] Filed: Dec. 30, 1994

[51] Int. Cl.$^6$ .................. G01B 7/30; G01B 7/14
[52] U.S. Cl. .................. 324/207.21; 338/32 R; 324/207.25
[58] Field of Search .................. 324/207.21, 207.22, 324/207.25, 173, 174, 252, 207.24; 338/38 R; 327/510; 33/706, 708

[56] References Cited

U.S. PATENT DOCUMENTS

| | | | |
|---|---|---|---|
| 4,628,259 | 12/1986 | Takahashi et al. | 324/207.21 |
| 4,818,939 | 4/1989 | Takahashi et al. | 324/207.21 |
| 5,019,776 | 5/1991 | Kawamata et al. | 324/252 X |
| 5,043,660 | 8/1991 | Hasegawa | 324/207.25 |
| 5,047,716 | 9/1991 | Kategiri | 324/207.21 |
| 5,084,674 | 1/1992 | Lachmann et al. | 324/174 |
| 5,216,363 | 6/1993 | Masaaki | 324/207.21 |
| 5,293,125 | 3/1994 | Griffen et al. | 324/173 |
| 5,386,642 | 2/1995 | Spies et al. | 324/207.21 |
| 5,422,569 | 6/1995 | Nakahara et al. | 324/174 |

*Primary Examiner*—Sandra L. O'Shea
*Assistant Examiner*—Jay M. Patidar
*Attorney, Agent, or Firm*—Nixon & Vanderhye P.C.

[57] ABSTRACT

A magnetoresistive sensor for use in a rotary encoder having a drum having a circumference covered with a magnetic track at a predetermined pitch includes a plurality of magnetoresistive elements positioned opposite the drum and connected in a bridge circuit such that when the drum rotates an output signal from the bridge indicates a rotary angle of the drum. The magnetoresistive elements include one or more complementary pairs of elements positioned 180° out of phase. Each of such pair of complementary magnetoresistive elements is connected in one leg of a bridge circuit such that jitter effects caused by asymmetric magnetic fields and physical differences between sensor elements are cancelled.

6 Claims, 5 Drawing Sheets

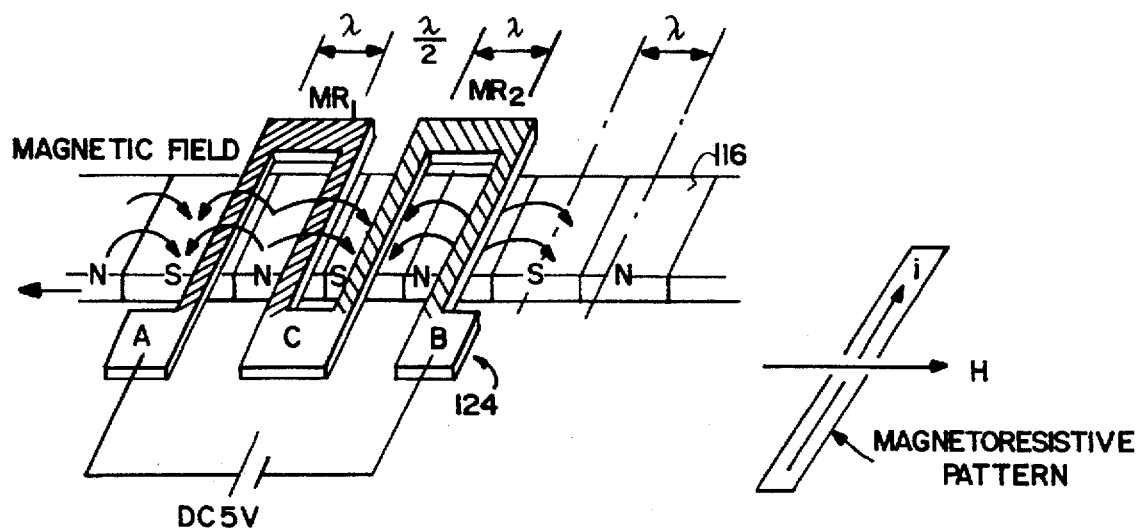
FIG. 2A
(PRIOR ART)
FIG. 2B
(PRIOR ART)
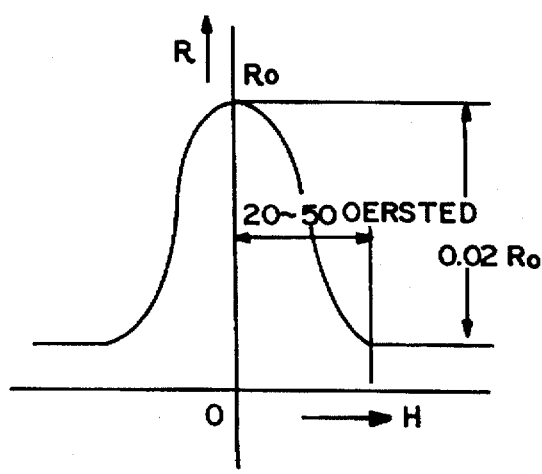
FIG. 2C
(PRIOR ART)
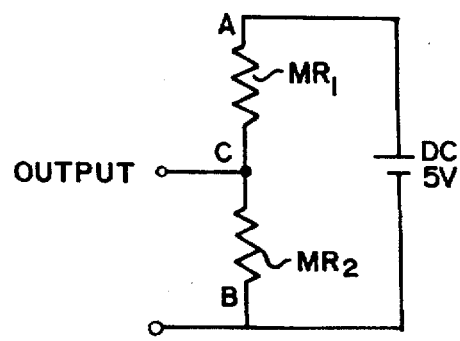
FIG. 2D
(PRIOR ART)

MAGNETORESISTIVE SENSOR WITH REDUCED OUTPUT SIGNAL JITTER

FIELD OF THE INVENTION

The present invention relates to a magnetoresistive sensor that finds particular application in rotating shaft encoders. In particular, the magnetoresistive sensor reduces jitter in the output signal created by asymmetries in sensed magnetic fields.

BACKGROUND AND SUMMARY OF THE INVENTION

Magnetoresistive sensors are based on the principle that the resistance of a ferromagnetic material changes when subjected to a magnetic flux. Magnetoresistive sensors have numerous applications including ascertaining shaft rotation parameters (position, acceleration, etc.) in the context of encoders, tachometers, etc. In this regard, U.S. Pat. No. 5,293,125 entitled "Self Aligning Tachometer With Interchangeable Elements For Different Resolution Outputs" assigned to the present assignee is incorporated herein by reference. In these applications, magnetoresistive sensors detect changes in magnetic fields to measure motion.

FIG. 1 shows one application of the present embodiment in which a magnetic drum 100 includes a peripheral surface 112 having two distinct tracks: an incremental or INC track 116 and an index or Z track 118. The rotary drum 100 is mounted to a shaft 114 which may be connected for example to a motor (not shown). The INC track 116 provides pulses indicating incremental shaft rotation and comprises an alternating series of magnetic north and south poles magnetically imprinted on the drum periphery 112 at a predetermined pitch $\lambda$ which may be on the order of hundreds of microns, (e.g., 747 microns in the preferred embodiment). Depending on the diameter of the drum 100, the peripheral surface 112 may encode a large number of pulses per revolution, (e.g., 480, 512, 600, etc.) The Z track 118 is used to generate one output pulse per revolution of the drum and thus provides information concerning the number of shaft revolutions and the absolute shaft position. Accordingly, whenever a Z pulse is generated, the motor shaft is known to be at a particular absolute position relative to the magnetoresistive sensor module 120.

Magnetoresistive sensor module 120 and 120' include a plurality of magnetoresistive elements positioned adjacent to and separated by a predetermined gap from the drum peripheral surface 112 as will be described in more detail below. The magnetoresistive INC track 116 has corresponding sensor module 120, and the Z track 118 has corresponding sensor module 120'. Both sensor modules 120 and 120' are connected to signal sensing and conditioning circuitry 122.

Each of the magnetoresistive sensors 120, 120' consists of a glass substrate covered with a thin film permalloy, e.g., a Ni—Fe film, which is photoetched into a pattern of individual elements which are connected to the sensing and signal conditioning circuitry 122 via one or more flexible leads. Reference is made to FIG. 2(a) which is a perspective view of a portion of the magnetized INC track 116 showing the adjacent north and south poles (N, S) on its incremental track and plural magnetoresistive elements 124 including elements $MR_1$ and $MR_2$ with connecting modes A, B, and C, a DC voltage being connected to nodes A and B. As can be seen from the drawing, the magnetoresistive elements are formed parallel to each other and to the north and south poles formed on the peripheral surface of the drum 112. The magnetoresistive elements are typically spaced some fraction of the pitch distance $\lambda$ separating each adjacent magnetic pole, e.g. $\lambda/2$ in FIG. 2(a).

FIG. 2(b) shows a current i generated in a linear magnetoresistive strip in response to an orthogonal magnetic field H. As shown in FIG. 2(c), the magnetoresistive strip experiences a drop in electrical resistance R (corresponding to an increase in current i) in the presence of the saturated magnetic field H. More specifically, the electrical resistance R of the thin film magnetoresistive pattern inversely varies in accordance with the strength of magnetic field H which intersects a perpendicular current i running through the magnetoresistive pattern as shown. In theory, the change in resistance R is independent of the polarity of the magnetic field H. However, as will be described in more detail below, this assumption is not reliable in practical magnetoresistive sensor applications.

Referring to FIG. 2(d), the magnetoresistive sensor elements $MR_1$ and $MR_2$ are conventionally connected in a resistive bridge array so as to provide differential outputs e.g., the output signal is taken from node C. Note as the drum 100 rotates the magnetic pole pattern on INC track 116 past the magnetoresistive sensor elements $MR_1$ and $MR_2$, an AC output generated at bridge circuit node C corresponds to the movement of the magnetic pole pattern and therefore the rotation of the drum 100.

Magnetoresistive sensors are designed to increase the output voltage level and to improve the temperature properties of the device by making bridge connections between several elements. Two phase outputs (i.e., A and B phases) are typically obtained from the sensor by offsetting the magnetoresistive sensor's pattern of elements from the north-south pole pattern on the INC track 116 of the magnetic drum 100 by one quarter of the pole pitch $\lambda$. FIG. 3 illustrates a simple configuration of magnetic resistive elements $a_1$, $b_1$, $a_2$, and $b_2$ positioned parallel to and above the magnetic pole surface corresponding magnetic field lines between four adjacent poles. One phase or channel of a magnetoresistive sensor comprises two magnetoresistive strips displaced an odd multiple of a half pole pitch from each other which in the layout in FIG. 3 is $3\lambda/2$. As the drum 100 rotates one pole pitch $\lambda$, the one channel sensor output (which can be assumed for simplicity to be an approximately sinusoidal output waveform) completes one cycle having a particular phase A. A quadrature signal (phase B) which is 90° out of phase from phase A is generated by the B channel magnetoresistive sensor elements B1 and B2 which are formed on the same substrate as elements A1 and A2 but displaced an odd multiple of a quarter pole pitch from the first pair A1, A2.

The phase A and phase B bridge outputs are typically amplified and converted into square waveforms using conventional comparators or other zero crossing detection methods. The square waveforms for phases A ($\theta_A$) and B ($\theta_B$) shown in FIG. 4 are in a quadrature relationship, i.e. $\theta_A$ leads $\theta_B$ by 90°. By combining the two quadrature phases $\theta_A$ and $\theta_B$ in an exclusive-OR gate, a single channel output of twice the frequency of the quadrature signals is obtained. This means that the output resolution of the magnetoresistive sensor is "doubled" without any increase in the number of magnetized poles formed on the rotary drum peripheral surface. Such sensors are referred to as frequency doubling sensors and achieve higher resolution without having to increase the manufacturing accuracy that would otherwise be required to make smaller magnetized poles on the rotary drum. In theory, additional exclusive-OR outputs may be recombined using further exclusive OR-gates to produce even higher resolutions by frequency tripling, quadrupling, etc. Although the present invention may be applied to frequency tripling, quadrupling, etc. embodiments, the present invention is described in the context of a frequency doubling sensor for the sake of simplicity.

A frequency doubling magnetoresistive sensor is shown in FIG. 5. The magnetoresistive sensor includes two sets of five magnetoresistive elements, the, first set including elements 5–9 and second set including elements 10–14. The first and second sets of magnetoresistive elements are separated by one drum magnetic pole pitch λ. Each magnetoresistive element within a group is spaced by some fraction of the pitch, e.g., by 3λ/8. Magnetoresistive elements 5–9 are connected to power supply Vcc which may be for example 5 volts. The other terminals of magnetoresistive elements 5–9 are connected to output terminals A–E and to terminals of corresponding magnetoresistive elements 10–14 from the second set. The other terminal of magnetoresistive elements 10–14 is connected to ground.

The bridge circuit schematic formed by the magnetoresistive sensor shown in FIG. 5 is illustrated in FIG. 6. Note that the magnetic field H generated by the magnetic poles formed on the drum shown in FIG. 5 is approximated as a sinusoid and assumes that the magnitude of all positive magnetic fields are identical to each other and all negative fields are identical to each other. If it could be further assumed that the positive field has the same magnitude as the negative field and that therefore the negative and positive fields are symmetric, the bridge outputs A–E could be combined to generate a frequency doubled square wave output having a constant period T. In other words, if it could be assumed that the magnetic fields generated from the magnetic pole drum pattern are uniform in magnitude and from pole to pole, the square wave output would be completely uniform.

In practice, the magnetic pole pattern formed on the drum surface is not symmetric, and the positive and negative magnetic fields may have different magnitudes. As a result of the fields generated from the magnetic pattern not repeating exactly from pole to pole, i.e., asymmetries in the detected magnetic field, the square waves generated by the bridge circuit do not have a uniform and constant period. This nonuniformity or variation in the period of the generated square waves is defined as "period jitter" or simply "jitter." More formally, jitter is defined as follows:

$$jitter = \frac{(\text{maximum period} - \text{minimum period})}{(\text{average period})} \times 100\%$$

In this definition, jitter is expressed as a percentage of the average period with 0% corresponding to no jitter.

Current encoders which employ frequency doubling magnetoresistive sensors produce jitter as high as twenty-five percent. However, jitter of less than five percent is desirable. Factors that contribute to the magnetic pole asymmetry that causes jitter include:

Hysteresis or bias of the magnetoresistive sensor material which occurs when the sensor material reaches maximum resistance at some magnetic field intensity other than zero. Sensor bias also occurs when the sensor is more sensitive to a magnetic field having one polarity than to a field of the same magnitude in the opposite pole direction.

Variations in the shape of the sensor output signal. Variations in the gap separation between the magnetized drum and the magnetoresistive sensor and third harmonic distortions and imperfections in the magnetized surface cause distortions in the output signal. These are often a function of or related to the direction of the magnetic field.

Misalignment of the sensor with respect to the magnetized pattern. This causes a distortion in the sensor output that manifests itself in part as a variation in the sensed field.

The present invention substantially reduces jitter in magnetoresistive sensors. A magnetoresistive sensor in accordance with the present invention includes one or more magnetoresistive elements positioned in array of magnetoresistive elements for detecting a changing magnetic field having an alternating polarity caused by relative movement between the magnetoresistive elements and a magnetized pattern wherein the one or more complementary magnetoresistive elements are positioned substantially 180° out of magnetic phase thereby compensating for and substantially cancelling the effects of jitter. By placing one or more pairs of complementary elements substantially 180° out of phase, asymmetric magnetic fields, individual physical differences between the sensors, sensor bias/hysteresis, distortion, and other nonuniformities are compensated. Each pair of complementary elements is combined in one leg of a bridge circuit where the output of each leg of the bridge circuit produces a waveform having a substantially constant period.

The present invention encompasses a rotary encoder having a drum having a circumference covered with a magnetic track having a predetermined pitch between magnetic poles and a magnetoresistive sensor. The sensor includes a plurality of magnetoresistive elements positioned opposite the drum and connected in a bridge circuit such that when the drum rotates, an output signal from the bridge indicates a rotary angle of the drum. The magnetoresistive elements include one or more elements positioned at a distance of one pitch from one or more other corresponding elements.

A method of making a magnetoresistive sensor having a plurality of parallel magnetoresistive elements includes positioning first magnetoresistive elements in a first series of locations and positioning one or more complementary magnetoresistive elements in one or more second locations so that the one or more complementary magnetoresistive elements are substantially 180° out of phase of a corresponding one or more of the first magnetoresistive elements. By making the magnetoresistive sensor in this way, signals generated by each corresponding pair of first element and a complementary element may be averaged to cancel nonsymmetric responses thereby reducing jitter.

BRIEF DESCRIPTION OF THE DRAWINGS

FIG. 2A is a perspective view of two magnetoresistive elements disposed above the magnetized track formed on the periphery of the magnetic drum;

FIG. 2B illustrates the relationship between current generated in a magnetoresistive pattern or strip as the result of a transverse magnetic field;

FIG. 2C is a graph illustrating how the resistance of the magnetoresistor changes with increasing magnetic fields;

FIG. 2(D) is a bridge circuit illustrating how the magnetoresistive elements of FIG. 2(a) are connected in a differential bridge configuration;

DETAILED DESCRIPTION OF THE DRAWINGS

In the following description, for purposes of explanation and not limitation, specific details are set forth, such as particular circuits, circuit components, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 1:
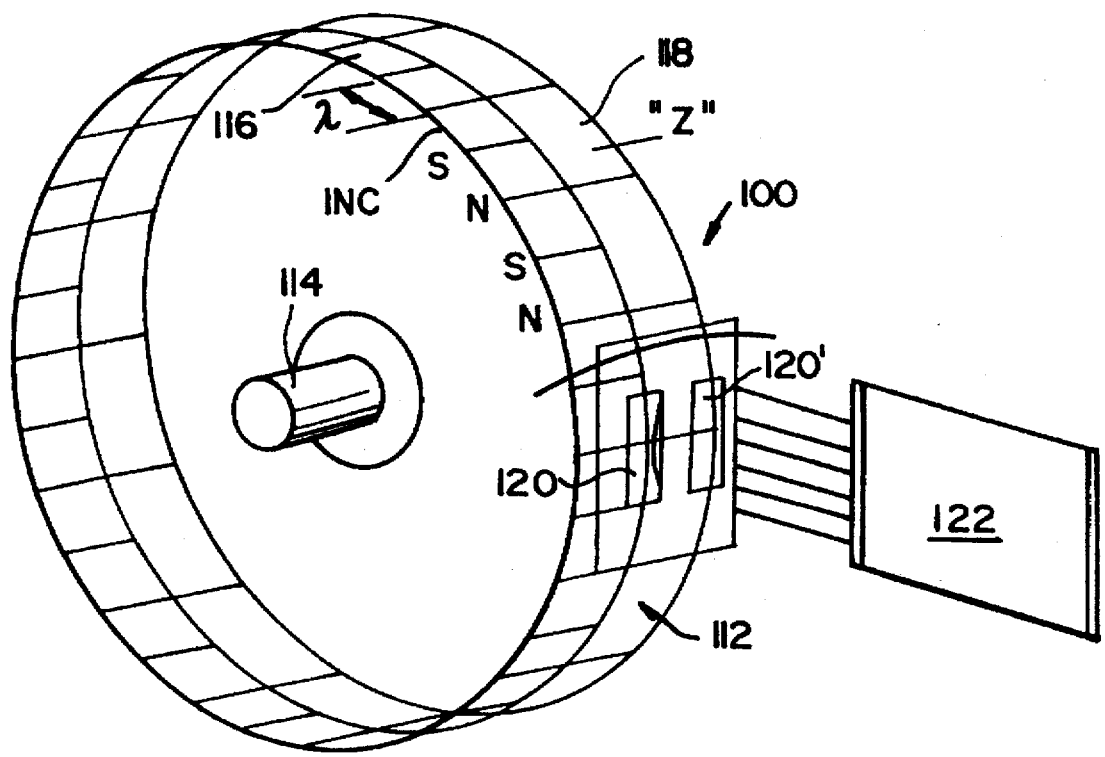
FIG. 1 is a schematic illustration of a magnetic drum having one or more magnetic tracks disposed on its peripheral surface and magnetoresistive elements and associated sensing and conditioning circuitry.
Figure 3:
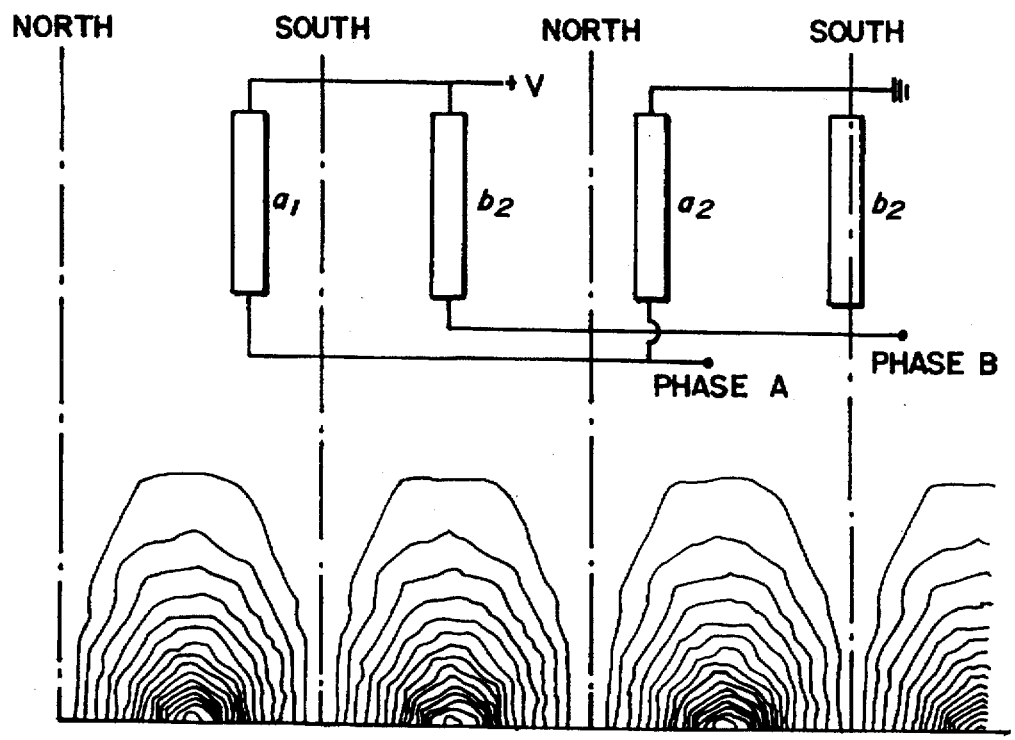
FIG. 3 is an illustration of how magnetoresistive elements are positioned above a magnetic field plot generated by the north/south poles formed on the magnetic drum in order to obtain different phase/quadrature output signals.
Figure 4:
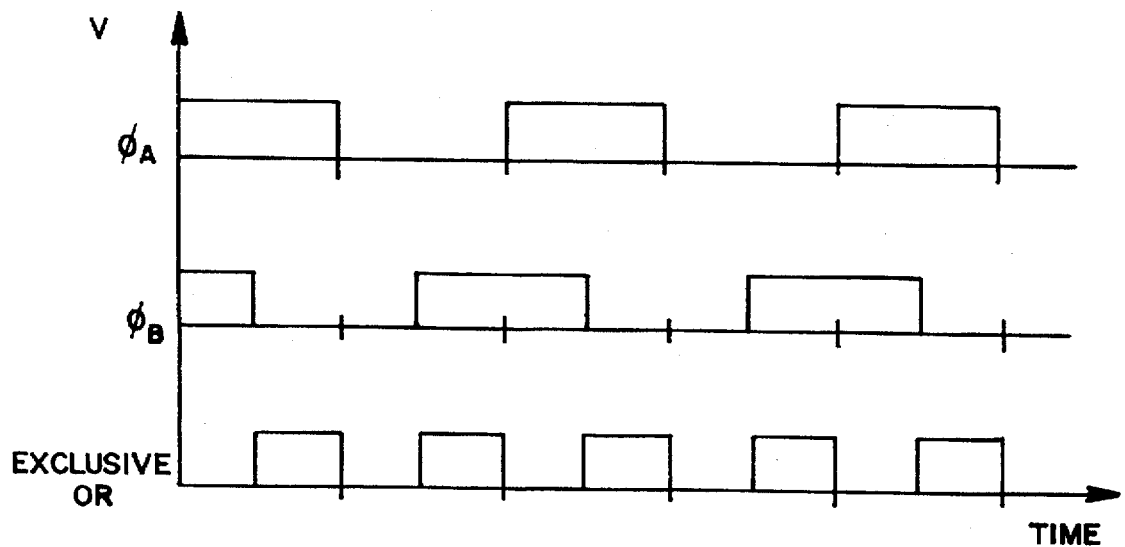
FIG. 4 is a graph of simplified waveforms indicating the quadrature relationship between phase A, phase B, and a double frequency generated by exclusive-ORing the two quadrature phases.
Figure 5:
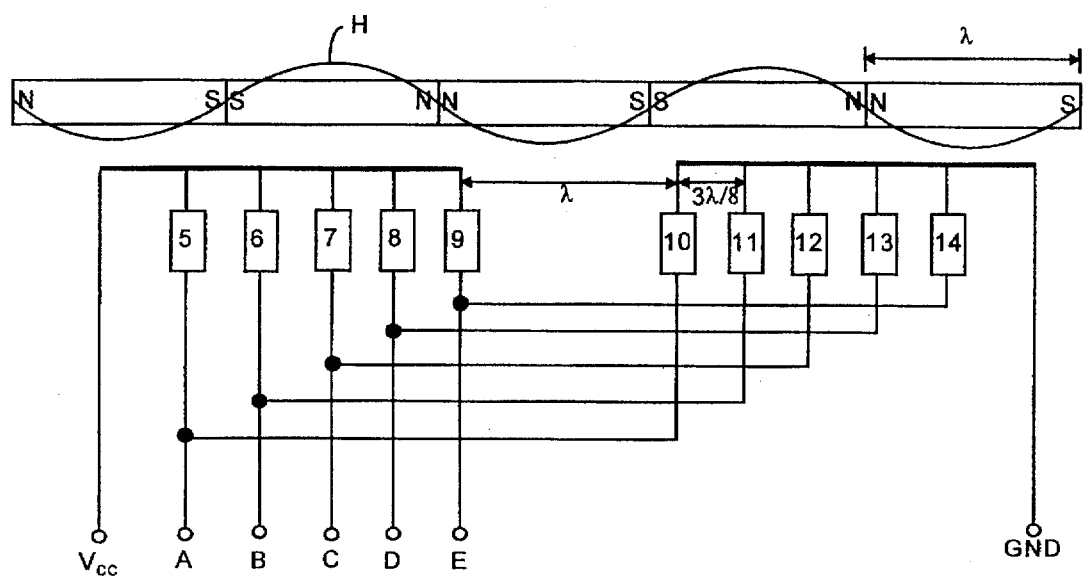
FIG. 5 illustrates the positional relationship of individual magnetoresistive elements provided in a frequency doubling magnetoresistive sensor with respect to the magnetic pole pattern formed on the magnetic drum.
Figure 6:
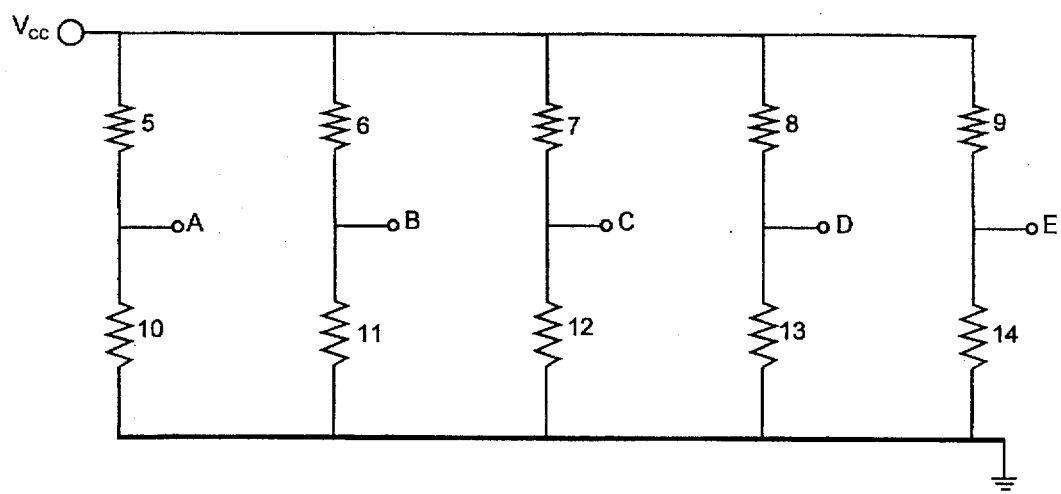
FIG. 6 is a electrical schematic showing the bridge circuit formed by connecting certain ones of the magnetoresistive elements of the magnetoresistive sensor illustrated in FIG. 5.
Figure 7:
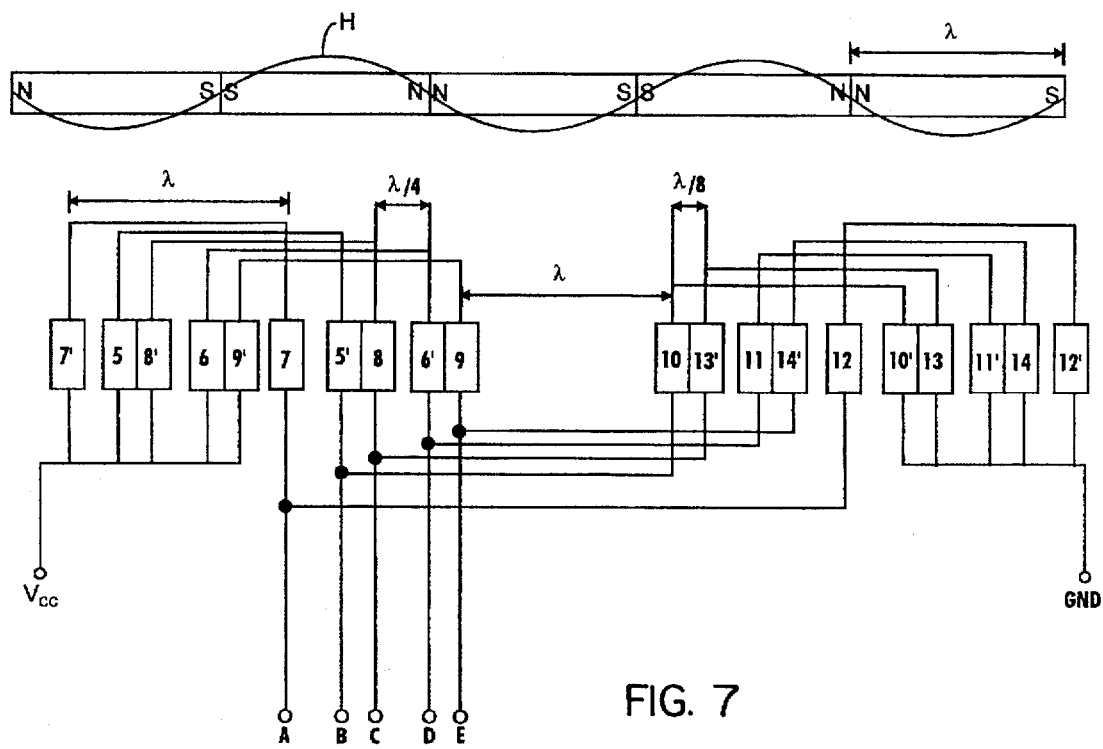
FIG. 7 illustrates a magnetoresistive sensor in accordance with a preferred embodiment of the present invention.

Referring to FIG. 7, a magnetoresistive sensor design in accordance with a preferred embodiment of the present invention is illustrated. In contrast to the frequency doubling sensor illustrated in FIG. 5 which includes ten total sensor elements grouped into two sets of five (i.e. 5–9 and 10–14), this example of the magnetoresistive sensor according to a preferred embodiment of the present invention in a frequency doubling context includes twice the number of magnetoresistive elements. However, the present invention is not limited to a particular number of elements. Ten magnetoresistive elements in a first set of elements (7', 5, 8', 6, 9', 7, 5', 8, 6', and 9) are separated by one pitch λ from a second set of ten magnetoresistive elements (10, 13', 11, 14', 12, 10', 13, 11', 14, and 12). Each of the unprimed magnetoresistive elements (5–14) includes a corresponding primed magnetoresistive element (5'–14') so that pairs of complementary primed and unprimed elements are formed, e.g. 7 and 7', 12 and 12', etc. The primed and the nonprimed magnetoresistive elements in the pair are positioned along the magnetic pole pattern such that they are substantially 180° out of magnetic phase. Thus, element 7 is adjacent to a positive polarity magnetic field, and its complementary magnetoresistive element 7' is spaced one magnetic pole pitch λ distance away at a position where the same magnitude but opposite polarity negative magnetic field exists. In other words, elements 7 and 7' are positioned at the same relative position between magnetic poles but in opposite polarity fields. This positional/magnetic phase relationship is established for each pair of complementary elements.

In this embodiment, each element and its complement in the first set of magnetoresistive elements 5–9 are connected in series between voltage supply Vcc and bridge output terminals A–E. Each magnetoresistive element in the second set of elements 10–14 and its complement 10'–14' are connected in series between output terminals A–E and ground. Although complementary pairs of magnetoresistive elements have been shown connected in series in each half "leg" of the bridge, they could also be connected in parallel in each half bridge leg.

Figure 8:
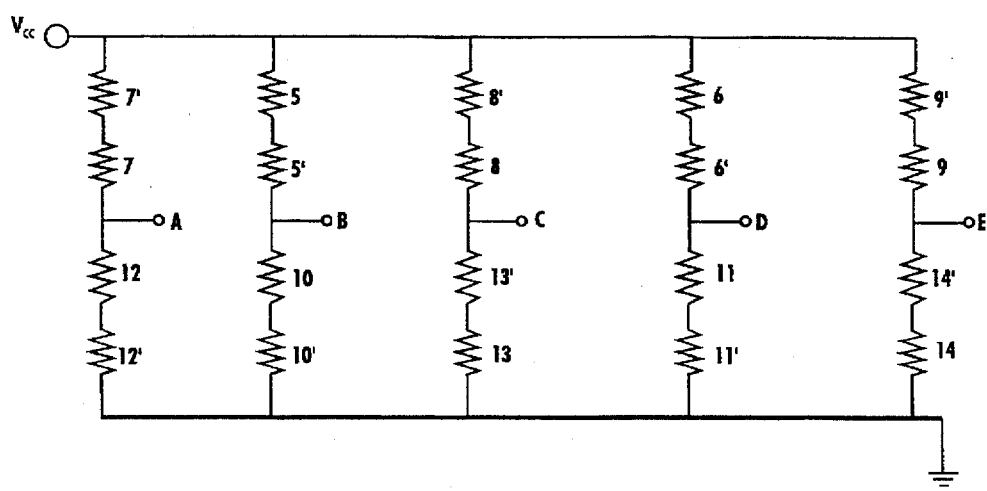
FIG. 8 is a bridge circuit corresponding to the magnetoresistive sensor element configuration shown in FIG. 7.

FIG. 8 illustrates the resulting bridge array including a resistive network having plural "legs" wherein a pair of complementary magnetoresistive elements from the first group, e.g. 7 and 7' are connected in series with an associated pair of complementary magnetoresistive elements from the second set (i.e. 12 and 12'). Electrical current flows through the plural bridge legs and output nodes A–E provide a differential voltage level which indicates the relative magnitudes of current flowing through the legs. As the magnetoresistive elements sensor change in resistance due to changes in magnetic flux caused by the magnetic drum rotating past the sensor, the current flowing through the plural bridge legs changes thereby causing a responsive change in the differential voltage level produced by the bridge at each output node. In this way the bridge array generates a changing voltage output level responsive to the magnetic flux sensed by the associated magnetoresistive elements.

The outputs of the bridge circuit in FIG. 8 are processed and shaped to form square wave output and then combined to form quadrature outputs to provide a frequency doubling function using conventional circuitry such as that disclosed for example in U.S. Pat. No. 5,293,125 incorporated by reference above.

The complementary pairs of magnetoresistive elements in the magnetoresistive sensor effectively implements a magnetic pole time domain cancellation. By connecting the complementary elements such that the primed and unprimed complementary elements are in the same quarter bridge (either in parallel or in series) the detected magnetic polarity asymmetries caused by periodic distortions in the detected magnetic field related to the direction of the magnetic field sensor hysteresis or bias distortions and imperfections, and other factors which contribute to jitter are substantially cancelled. Alternatively, a limited number of complementary "pairs" could be used so that, for example, some sensor elements might have a complementary element and some sensor elements might not.

It is preferred that each unprimed element includes a corresponding primed complementary element positioned to achieve optimal jitter cancellation. However, in accordance with the present invention, jitter can still be cancelled, but to a lesser degree, using only one complementary element. Therefore, the present invention may be practiced with one complementary element corresponding to only one unprimed element in the first set, a number of complementary elements less than the total number in the first set, or a complete second set of corresponding complementary elements. Increasing the number of complementary elements increases the amount of jitter cancelled.

Since jitter is basically due to magnetic pole asymmetry, the present invention in the preferred embodiment effectively implements a two signal averaging technique such that a north pole sensor element and a south pole sensor element are averaged together via connection in a half leg of the bridge. Of course, other circuits and/or techniques may be used to implement the sensor element averaging. In addition, more than two signals could be averaged together to achieve the jitter cancellation effect as long as the elements being averaged are positioned in the magnetoresistive element array such that they compensate for asymmetric nonuniformities. Jitter values for a frequency doubling magnetoresistive sensor designed in accordance with the present invention achieved jitter values of less than one percent. Accordingly, the present invention can be used to great advantage to increase the accuracy and reliability of magnetoresistive sensors used, for example, in high precision rotary encoders.

The present invention also includes methods of making a magnetoresistive sensor for detecting a changing magnetic field with substantially reduced jitter. For example, a first set of magnetoresistive elements is positioned in a first set of locations corresponding to the locations of the unprimed elements in FIG. 7. A second set (including a set of one, a partial set, and a complete set) of complementary magnetoresistive elements is positioned in a second series of locations corresponding to the primed magnetoresistive elements illustrated in FIG. 7. These locations are selected such that the first and second sets of magnetoresistive elements are positioned substantially 180° out of phase with respect to the change in magnetic field. Individual elements from the first and second sets are combined in a bridge circuit to cancel out asymmetries in the detected magnetic field.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A frequency multiplying magnetoresistive sensor assembly in opposing relation to a magnetic scale magnetized at a pitch $\lambda$, comprising:

a first and a second group of magnetoresistive elements detecting a changing magnetic field caused by relative movement between the sensor assembly and the magnetic scale, the first and second groups of magnetoresistive elements being separated by at least the pitch $\lambda$ so that an element in the first group closest to an element in the second group are separated by at least $\lambda$, each one of the magnetoresistive elements from the first group being connected to a corresponding magnetoresistive element from the second group to form a half-bridge, an output signal from each half-bridge having a first frequency, the first group of magnetoresistive elements including first pairs of complementary magnetoresistive elements spaced apart by the pitch $\lambda$ and electrically connected together and the second group of magnetoresistive elements including second pairs of complementary magnetoresistive elements spaced apart by the pitch $\lambda$ and electrically connected together, there being non-uniform spacing between some adjacent magnetoresistive elements in the first group and between some adjacent magnetoresistive elements in the second group, wherein electrical connection of complementary magnetoresistive elements compensates for asymmetries in magnetic field detected by each magnetoresistive element, and wherein output signals from two of the half-bridges are combined to provide a combined output signal having a second frequency that is at least twice the first frequency.

2. The sensor in claim 1, wherein the first group includes ten magnetoresistive elements with five of the ten magnetoresistive elements being complementary magnetoresistive elements and the second group includes ten magnetoresistive elements with five of the ten magnetoresistive elements being complementary magnetoresistive elements.

3. The sensor assembly in claim 1, wherein the magnetoresistive elements in each half-bridge are connected in series.

4. A method of substantially eliminating jitter in the output signals from a magnetoresistive sensor having a plurality of magnetoresistive elements, comprising the steps of:

providing a series of alternating north and south magnetic poles on a single track where adjacent north and south poles are separated by a pitch $\lambda$;

locating opposite the alternating north and south poles a first group of magnetoresistive elements and a second group of magnetoresistive elements such that closest elements from the first and second groups are separated by at least the pitch $\lambda$;

forming in the first group of magnetoresistive elements first pairs of complementary magnetoresistive elements spaced apart by approximately the pitch $\lambda$;

electrically connecting each of the first pairs of complementary magnetoresistive elements;

forming in the second group of magnetoresistive elements second pairs of complementary magnetoresistive elements spaced apart by the pitch $\lambda$;

electrically connecting each of the second pairs of complementary magnetoresistive elements, there being non-uniform spacing between some adjacent magnetoresistive elements in the first group and between some adjacent magnetoresistive elements in the second group;

electrically connecting each first pair of complementary magnetoresistive elements from the first group at a corresponding output node to an associated second pair of complementary magnetoresistive elements from the second group;

connecting ones of the magnetoresistive elements from the first group to corresponding magnetoresistive elements from the second group to form corresponding half-bridges;

generating at each half-bridge an output signal having a first frequency; and combining output half-bridge signals to provide a high resolution signal representing a changing magnetic field detected by the magnetoresistive sensors as relative movement is effected between the magnetoresistive elements and the series of alternating north and south poles, said high resolution signal having a second frequency that is at least double the first frequency, wherein electrical connection of complementary magnetoresistive elements compensates for asymmetries in magnetic field detected by each magnetoresistive element that cause output signal jitter.

5. The method in claim 4, wherein the first frequency of each half-bridge output signal is a frequency of the changing magnetic field.

6. A rotary encoder, comprising:

a drum having a peripheral surface covered with a single magnetic track of alternating magnetic poles having a predetermined pitch;

a frequency multiplying magnetoresistive sensor positioned opposite the peripheral surface for generating a periodic waveform caused by relative movement between the sensor and the single magnetic track of the drum such that when the drum rotates, an output signal from the sensor indicates a rotary angle of the drum, the sensor having a plurality of magnetoresistive sensor elements configured to compensate for asymmetries in magnetic field detected by each magnetoresistive element including:

a first and a second group of magnetoresistive elements for detecting a changing magnetic field caused by relative movement between the sensor and the single magnetic track, the first and second groups of magnetoresistive elements being separated in the array by the predetermined pitch and each one of the magnetoresistive elements from the first group being connected to a corresponding magnetoresistive element from the second group to form a half-bridge, an output signal from each half-bridge having a first frequency, the first group of magnetoresistive elements including first pairs of complementary magnetoresistive elements spaced apart by the predetermined pitch and electrically connected together and the second group of magnetoresistive elements including second pairs of complementary magnetoresistive elements spaced apart by the predetermined pitch and electrically connected together, there being non-uniform spacing between at least some of the magnetoresistive elements in the first group and between at least some of the magnetoresistive elements in the second group, wherein output signals from at least two of the half-bridges are combined to provide a combined output signal having a second frequency that is at least twice the first frequency, thereby providing a high resolution signal representing the changing magnetic field.

* * * * *